Jan. 5, 1971   M. BRESCIA, JR., ET AL   3,552,813
REMOVABLE FREE WHEELING HUB
Filed Jan. 31, 1969   2 Sheets-Sheet 1
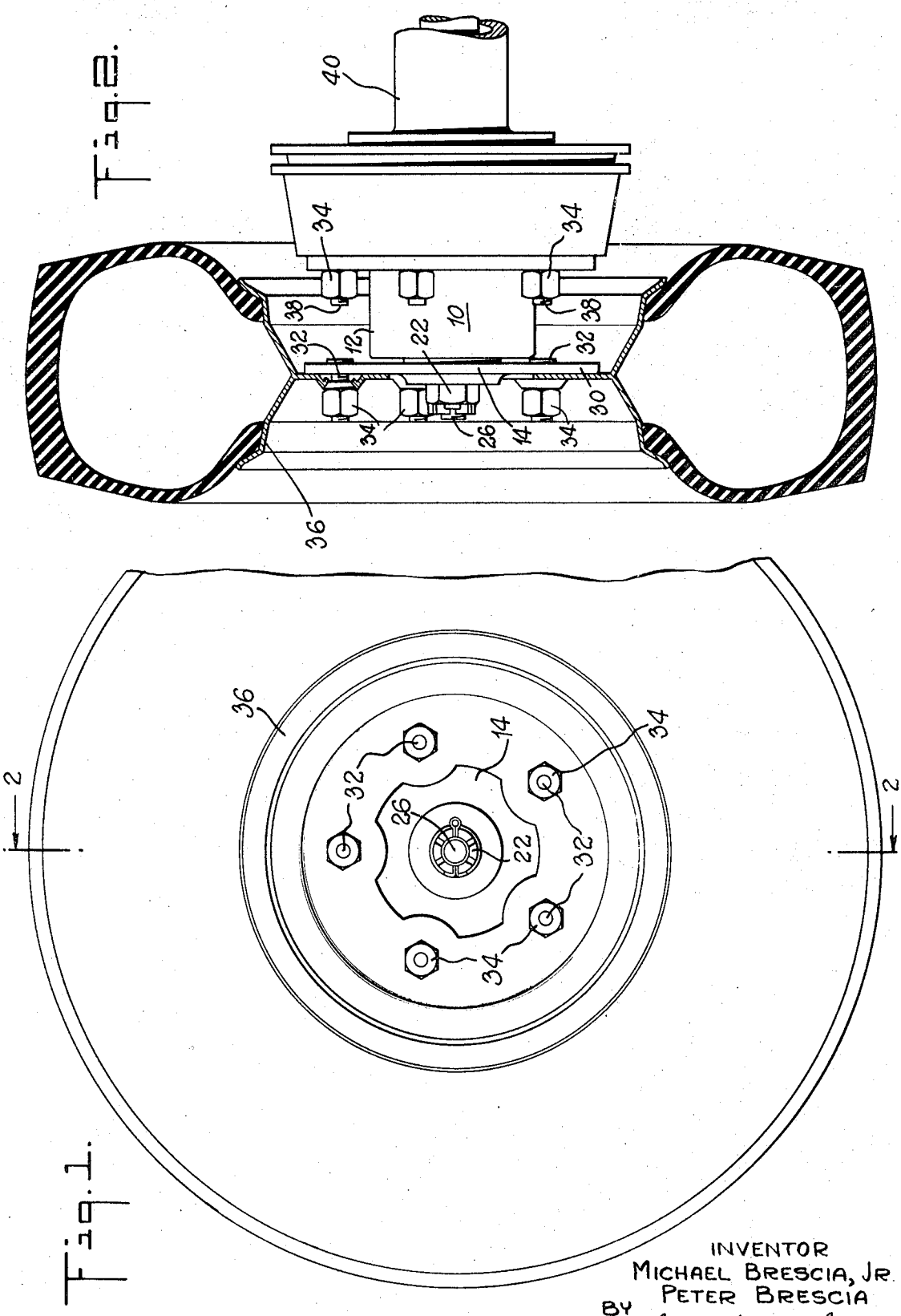
INVENTOR
MICHAEL BRESCIA, JR.
PETER BRESCIA
BY
Samuelson & Jacob
ATTORNEYS Jan. 5, 1971   M. BRESCIA, JR., ET AL   3,552,813
REMOVABLE FREE WHEELING HUB
Filed Jan. 31, 1969   2 Sheets-Sheet 2
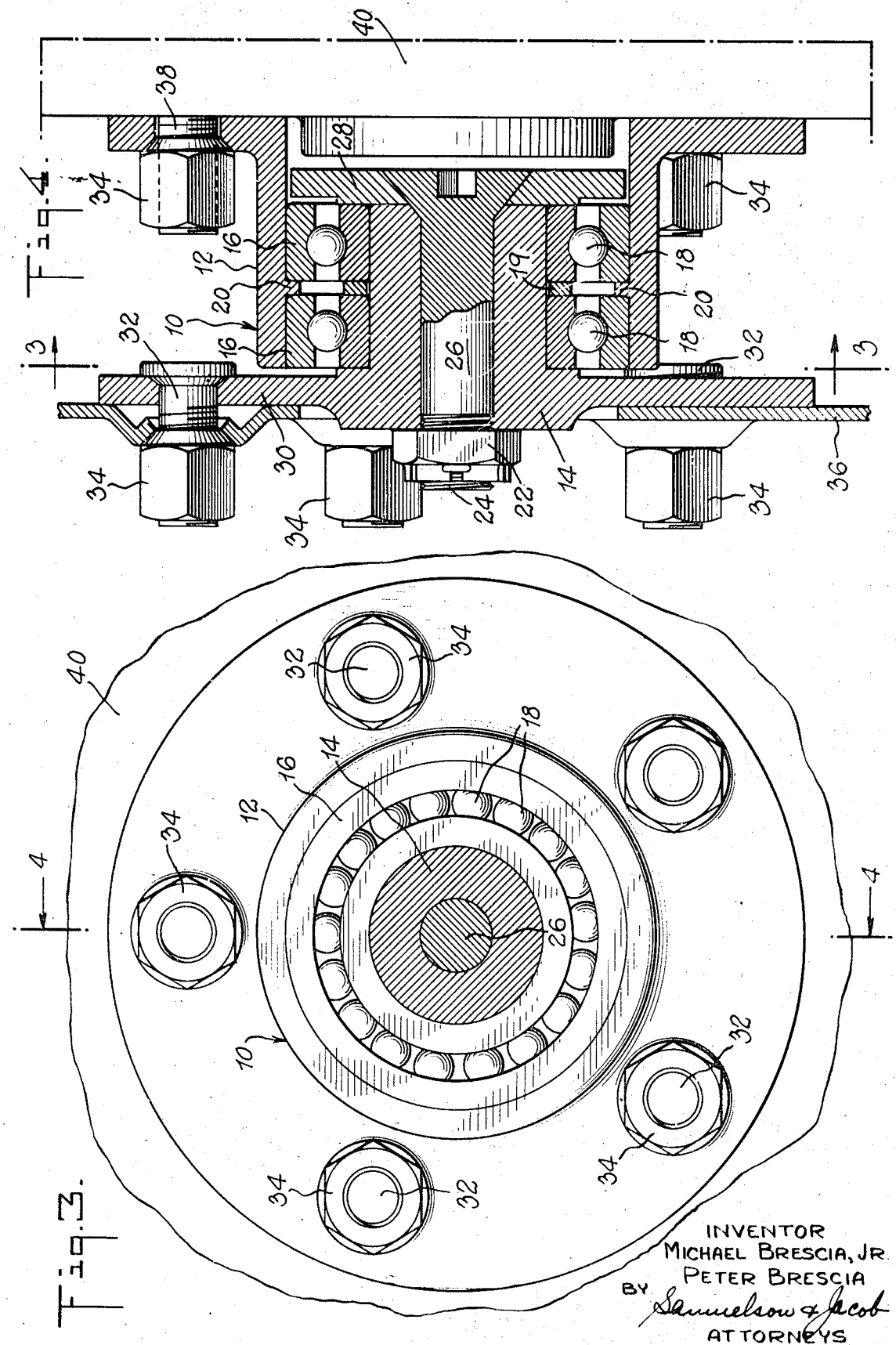
INVENTOR
MICHAEL BRESCIA, JR.
PETER BRESCIA
BY Samuelson & Jacob
ATTORNEYS

United States Patent Office 3,552,813
Patented Jan. 5, 1971

3,552,813
REMOVABLE FREE WHEELING HUB
Michael Brescia, Jr., 12 Old Milford Lane, West Milford, N.J. 07480, and Peter Brescia, 1135 Roosevelt Ave., New Milford, N.J. 07646
Filed Jan. 31, 1969, Ser. No. 795,655
Int. Cl. F16c 19/02
U.S. Cl. 308—191        4 Claims

ABSTRACT OF THE DISCLOSURE

A removable, free wheeling, hub for attachment between the drive axle and the wheel of a vehicle when the vehicle is towed having a fixed support removably affixed to the drive axle and a member partially within the fixed support and rotatable with respect thereto to which the wheel is removably affixed.

---

The invention relates to free wheeling hubs which may be affixed between the drive axle and the wheels of a vehicle when the vehicle is being towed to prevent damage to the drive train.

When vehicles which have automatic transmissions are towed for relatively long distances and the drive wheels are left in contact with the ground, the automatic transmission may be burned out or otherwise damaged. Consequently, it is necessary to raise the drive wheels off the ground and tow the vehicle with only two of its four wheels in contact with the ground. This is not always convenient since the towing vehicle does not always have a winch to raise the drive wheels off the ground.

Particularly, where a vehicle is being used only for drag racing and is not licensed to be driven on public highways, it is necessary to tow the vehicle. Obviously, since the average drag racer is not equipped with a tow truck, he must tow his drag vehicle with his family car.

Accordingly, it is an important object of the invention to provide a hub which may be removably mounted between each of the drive wheels and the drive axle so that the wheels will rotate on the ground as the vehicle is towed and rotational motion is not transmitted to the drive axle. The foregoing is accomplished by providing a fixed outer support and a member partially within the outer support and rotatable with respect thereto. The fixed outer support is removably affixed to the axle and the wheel is removably affixed to the rotatable member.

It is a further object of the invention to provide bearing means between the fixed outer support and the rotatable member to facilitate the rotation of the rotatable member with respect to the outer support.

It is a still further object of the invention to provide such a bearing comprising at least one race between the rotatable member and the outer support and a plurality of balls having a low coefficient of friction in the race.

These and other objects, advantages, features and uses will be apparent during the course of the following description when taken in conjunction with the following drawing wherein:

FIG. 1 is an elevational view showing a vehicle wheel affixed to the free wheeling hub of the invention;

FIG. 2 is a sectional view, taken along the lines 2—2 of FIG. 1, viewed in the direction of the arrows;

FIG. 3 is a view to a larger scale and is a sectional view taken on the lines 3—3 of FIG. 4, viewed in the direction of the arrows; and FIG. 4 is a sectional view taken on the lines 4—4 of FIG. 3, viewed in the direction of the arrows.

In the drawings, wherein, for the purpose of illustration, is shown a preferred embodiment of the invention, the numeral 10 designates the removable, free wheeling, hub of the invention generally.

Hub 10 (FIGS. 3 and 4) is seen to comprise outer support 12, rotatable member 14, ball bearing races 16 and balls 18 which are made of material having a low coefficient of friction such as polished steel. The bearing races 16 are held in position by means of retaining ridge 20 which is a part of outer support 12 and annular ring 19. Inner member 14 is held in position by means of nut 22 which engages threads 24 on bolt 26 which holds backing plate 28 in position.

Plate 30 is integral with rotatable member 14 so as to rotate therewith and is provided with studs 32 onto which nuts 34 are threaded to hold the wheel 36 in place.

Nuts 34 are also threaded onto studs 38 which are a part of axle 40 to affix hub 10 to the axle.

When the vehicle is to be driven by its own engine, the drive wheels 36 are affixed directly to the axle by means of nuts 34 and studs 38. When it is desired to tow the vehicle, the drive end (generally the rear) is jacked off the ground, the nuts 34 are removed from the studs 38 and the drive wheels (generally two) are removed. Next a hub 10 is affixed to each end of the drive axle from which a drive wheel has been removed by means of nuts 34 and studs 38. Now, the wheels 36 are affixed to the hubs 10 by means of nuts 34 and studs 32. The vehicle is lowered so that the drive wheels 36 are in contact with the ground.

The vehicle can now be towed without raising any of its wheels off the ground and without transmitting any rotational motion from the drive wheels to the drive axle and the transmission.

While a particular embodiment of the invention has been shown and described, it is apparent to those skilled in the art that modifications are possible without departing from the spirit and scope of the invention.

The embodiments of the invention in which an exclusive property or privilege is claimed are defined as follows:

1. A removable, free wheeling, hub between the drive axle and the wheel of a vehicle when the vehicle is towed comprising:
    an outer support;
    means for removably affixing the outer support to the drive axle;
    a rotatable member mounted partially within the outer support and rotatable with respect thereto; and
    means for removably affixing the wheel to the rotatable member so that when the vehicle is towed and the wheel rotates rotational motion is not transmitted to the drive axle.

2. The invention of claim 1 including bearing means located between the outer support and the rotatable member to facilitate the rotation of the inner member with respect to the outer support.

3. The invention of claim 2 wherein the bearing means comprises a race and a plurality of balls having a low coefficient of friction in the race.

4. The invention of claim 2 wherein the bearing means comprises two races and a plurality of balls having a low coefficient of friction in each race.

References Cited

UNITED STATES PATENTS

| | | | |
|---|---|---|---|
| 1,169,271 | 1/1916 | Laycock | 308—191 |
| 2,081,566 | 5/1937 | Winkler | 308—191 |
| 2,565,791 | 8/1951 | Wagner et al. | 308—183 |

FRED C. MATTERN, Jr., Primary Examiner

F. SUSKO, Assistant Examiner